United States Patent
Lien et al.

(10) Patent No.: US 7,827,540 B2
(45) Date of Patent: Nov. 2, 2010

(54) METHOD FOR PROGRAM DEBUGGING

(75) Inventors: Hsiu-Chuan Lien, Chi-Lung (TW); Hai-Yu Tseng, legal representative, Taipei Hsien (TW); Yi-Chi Huang, Taipei Hsien (TW); Ko-Pin Huang, Taipei Hsien (TW)

(73) Assignee: Micro-Star Int'l Co., Ltd., Chung-Ho, Taipei Hsien (TW)

( * ) Notice: Subject to any disclaimer, the term of this patent is extended or adjusted under 35 U.S.C. 154(b) by 369 days.

(21) Appl. No.: 10/708,153

(22) Filed: Feb. 11, 2004

(65) Prior Publication Data
US 2004/0194067 A1    Sep. 30, 2004

(30) Foreign Application Priority Data
Feb. 13, 2003    (TW)    ............... 92103002 A

(51) Int. Cl.
G06F 9/44 (2006.01)
G06F 15/177 (2006.01)
G06F 11/00 (2006.01)
(52) U.S. Cl. ............... 717/129; 713/2; 714/38
(58) Field of Classification Search ............... None
See application file for complete search history.

(56) References Cited

U.S. PATENT DOCUMENTS

| | | | | |
|---|---|---|---|---|
| 4,280,060 A | * | 7/1981 | Kure-Jensen et al. | 290/40 R |
| 4,819,234 A | * | 4/1989 | Huber | 717/129 |
| 5,245,615 A | * | 9/1993 | Treu | 714/45 |
| 5,321,828 A | * | 6/1994 | Phillips et al. | 703/28 |
| 5,339,422 A | * | 8/1994 | Brender et al. | 714/4 |
| 5,463,766 A | * | 10/1995 | Schieve et al. | 713/2 |
| 5,548,717 A | * | 8/1996 | Wooldridge et al. | 717/124 |
| 5,768,591 A | * | 6/1998 | Robinson | 717/124 |
| 5,819,023 A | * | 10/1998 | Klingler | 714/34 |
| 5,819,093 A | * | 10/1998 | Davidson et al. | 717/126 |
| 5,838,975 A | * | 11/1998 | Abramson et al. | 717/129 |
| 5,850,562 A | * | 12/1998 | Crump et al. | 713/1 |
| 5,896,523 A | * | 4/1999 | Bissett et al. | 713/400 |
| 6,042,614 A | * | 3/2000 | Davidson et al. | 717/116 |
| 6,081,783 A | * | 6/2000 | Divine et al. | 704/500 |
| 6,205,560 B1 | * | 3/2001 | Hervin et al. | 714/34 |
| 6,286,132 B1 | * | 9/2001 | Tanaka et al. | 717/125 |
| 6,477,666 B1 | * | 11/2002 | Sanchez et al. | 714/41 |
| 6,493,834 B1 | * | 12/2002 | Bates et al. | 714/38 |
| 6,502,102 B1 | * | 12/2002 | Haswell et al. | 707/102 |
| 6,543,049 B1 | * | 4/2003 | Bates et al. | 717/129 |
| 6,598,178 B1 | * | 7/2003 | Yee et al. | 714/34 |
| 6,598,181 B1 | * | 7/2003 | Pennell | 714/38 |
| 6,651,187 B2 | * | 11/2003 | Lacey, III | 714/38 |
| 6,658,649 B1 | * | 12/2003 | Bates et al. | 717/124 |
| 6,964,035 B2 | * | 11/2005 | Poynor | 717/124 |
| 6,973,417 B1 | * | 12/2005 | Maxwell et al. | 703/2 |

(Continued)

*Primary Examiner*—Tuan Q Dam
*Assistant Examiner*—Zheng Wei
(74) *Attorney, Agent, or Firm*—Winston Hsu; Scott Margo; Min-Lee Teng

(57) ABSTRACT

A method for program debugging includes setting a plurality of breakpoints corresponding to a plurality of events in an implementation under test, executing the implementation under test for outputting a diagnosis code of a breakpoint, resetting a parameter of the event corresponding to the diagnosis code, and executing the event according to the reset parameter for making the event undergo an error handler. The method helps execute functions of error handlers and execute a test completely.

11 Claims, 5 Drawing Sheets

U.S. PATENT DOCUMENTS

| | | | | |
|---|---|---|---|---|
| 6,981,248 B2* | 12/2005 | Bates et al. | | 717/129 |
| 7,007,268 B2* | 2/2006 | Emberson | | 717/127 |
| 7,085,700 B2* | 8/2006 | O'Riordan et al. | | 703/14 |
| 7,133,820 B2* | 11/2006 | Pennello et al. | | 703/22 |
| 7,185,321 B1* | 2/2007 | Roe et al. | | 717/134 |
| 7,206,733 B1* | 4/2007 | Nemecek | | 703/25 |
| 7,353,427 B2* | 4/2008 | Bates et al. | | 714/38 |
| 2002/0129338 A1* | 9/2002 | MacDonell | | 717/126 |
| 2002/0162051 A1* | 10/2002 | Bolding et al. | | 714/34 |
| 2003/0005415 A1* | 1/2003 | Bates et al. | | 717/129 |
| 2003/0037225 A1* | 2/2003 | Deng et al. | | 712/227 |
| 2003/0037317 A1* | 2/2003 | Emberson | | 717/129 |
| 2003/0041315 A1* | 2/2003 | Bates et al. | | 717/129 |
| 2003/0061599 A1* | 3/2003 | Bates et al. | | 717/129 |
| 2003/0084430 A1* | 5/2003 | Bates et al. | | 717/131 |
| 2003/0115576 A1* | 6/2003 | Bates et al. | | 717/129 |
| 2003/0145124 A1* | 7/2003 | Guyan et al. | | 709/318 |
| 2003/0177476 A1* | 9/2003 | Sarma et al. | | 717/128 |
| 2003/0188225 A1* | 10/2003 | Bates et al. | | 714/38 |
| 2003/0208746 A1* | 11/2003 | Bates et al. | | 717/129 |
| 2003/0217354 A1* | 11/2003 | Bates et al. | | 717/129 |
| 2004/0010773 A1* | 1/2004 | Chan et al. | | 717/104 |
| 2004/0019831 A1* | 1/2004 | Gergen et al. | | 714/34 |
| 2004/0031019 A1* | 2/2004 | Lamanna et al. | | 717/125 |
| 2004/0205720 A1* | 10/2004 | Hundt | | 717/124 |
| 2005/0188358 A1* | 8/2005 | Johnson et al. | | 717/129 |
| 2007/0006158 A1* | 1/2007 | Takuma et al. | | 717/124 |

* cited by examiner

US 7,827,540 B2

METHOD FOR PROGRAM DEBUGGING

BACKGROUND OF INVENTION

1. Field of the Invention

The present invention relates to a method for program debugging, and more particularly, to a method for program debugging which can debug program codes.

2. Description of the Prior Art

In the programming field, the development tools are low level program languages and high level program languages. The text of program codes written in low level languages (e.g. assembly language) is more similar to machine language, but the programming and debugging are not easy. Due to better executing efficiency, low level languages are usually used in basic input/output systems (BIOS) or driver programs.

Take a BIOS for example. After a computer turns on, the main function of the BIOS is to a execute power on self test (POST) to detect whether the settings of peripheral devices are correct, peripheral devices being controlled by the operating system. With the complexity of computers, types of peripheral devices are gradually increasing, such as keyboards, disc units, disc controllers, hard disks, video disc players and so on. Therefore the operation of BIOS becomes more complex. Suppose that the operation of a device on the motherboard is improper or that the programming of BIOS program code contains an error. Since the operating system is not loaded yet, errors are debugged by source codes instead of debug software. This requires more time and a lot of work.

To speed up the debug process, there are two general methods. One method is to insert a debug interface card into the motherboard and to add several diagnosis codes to the BIOS program code. When the BIOS program code is executed at different sections, a diagnosis code would be sent from port 80h to the debug interface card for locking the section. Therefore sections at which errors occur can be found by trapping diagnosis codes.

Please refer to FIG. 1. The other method is called in circuit emulator (ICE). Take a host 7 as the program start, and connect the host 7 and an emulator 8 by the connection port of the host 7 (RS232 or printer parallel port). Also, take a motherboard 9 as the program target, and connect the motherboard 9 and the emulator 8. The host includes assemblers, script files, and so on. The emulator 8 is utilized to simulate a CPU and the emulator 8 is inserted into the CPU slot. Therefore the software of the host 7 can be utilized to control the emulator 8 for remote debugging.

Although the remote debugging provides a good environment for software and hardware, the debug process is still executed by technicians, who execute the script file to BIOS and observe if BIOS is executed as expected. A technician needs to set many breakpoints in places where bugs might occur, and when running into a breakpoint, stop executing the program and determine if the result of the execution is expected. If not, this means that there are bugs in the program codes and the technician must narrow the range to execute the same steps to search for program errors.

However, in the debug of BIOS, besides errors of the program codes, the most important thing is how error handlers of BIOS deal with errors of peripheral devices. For instance, when BIOS detects hardware errors, the motherboard typically provides an alert such as a beep. Due to a large number of peripheral devices, the debug method mentioned above cannot detect if error handlers are missed, and cannot debug all of the error handlers immediately.

SUMMARY OF INVENTION

It is therefore a primary objective of the claimed invention to provide a method which can immediately debug error handlers of an implementation under test (IUT).

The method for program debugging in the claimed invention comprises: setting a plurality of breakpoints corresponding to a plurality of events in an implementation under test, executing the implementation under test for outputting a diagnosis code of a breakpoint, resetting a parameter of the event corresponding to the diagnosis code, and executing the event according to the reset parameter for making the event undergo an error handler.

These and other objectives of the present invention will no doubt become obvious to those of ordinary skill in the art after reading the following detailed description of the preferred embodiment that is illustrated in the various figures and drawings.

DETAILED DESCRIPTION

The above-mentioned and other techniques and advantages of the present invention are clearly disclosed in the following embodiment of the present invention.

Before describing the present invention, it should be noted that the present invention is still executed by an ICE. Development tools for programming script files and emulators connected to the host can be selected from ITP products such as those of American Arium or Cisco Systems, which are known to one of ordinary skill in the art.

Figure 1:
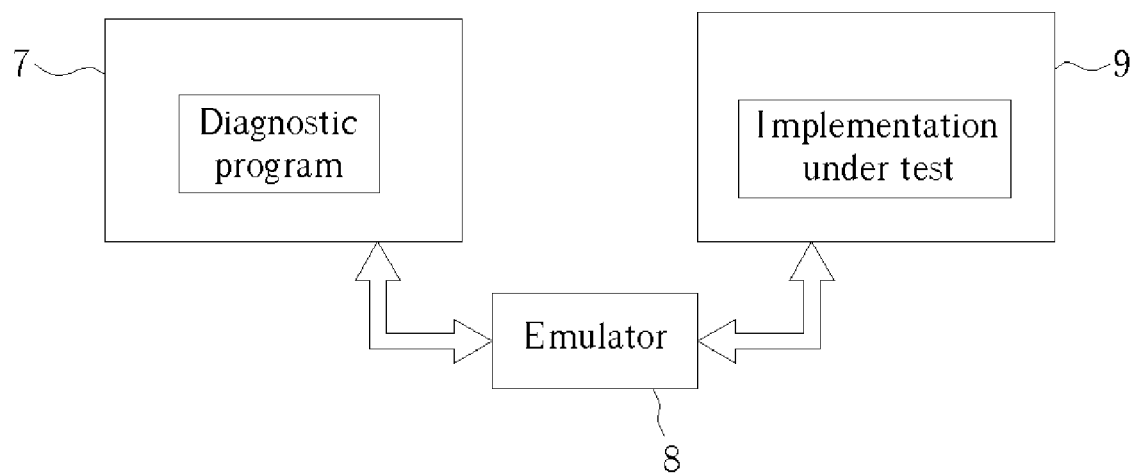
FIG. 1 is an ICE debug system.
Figure 2:
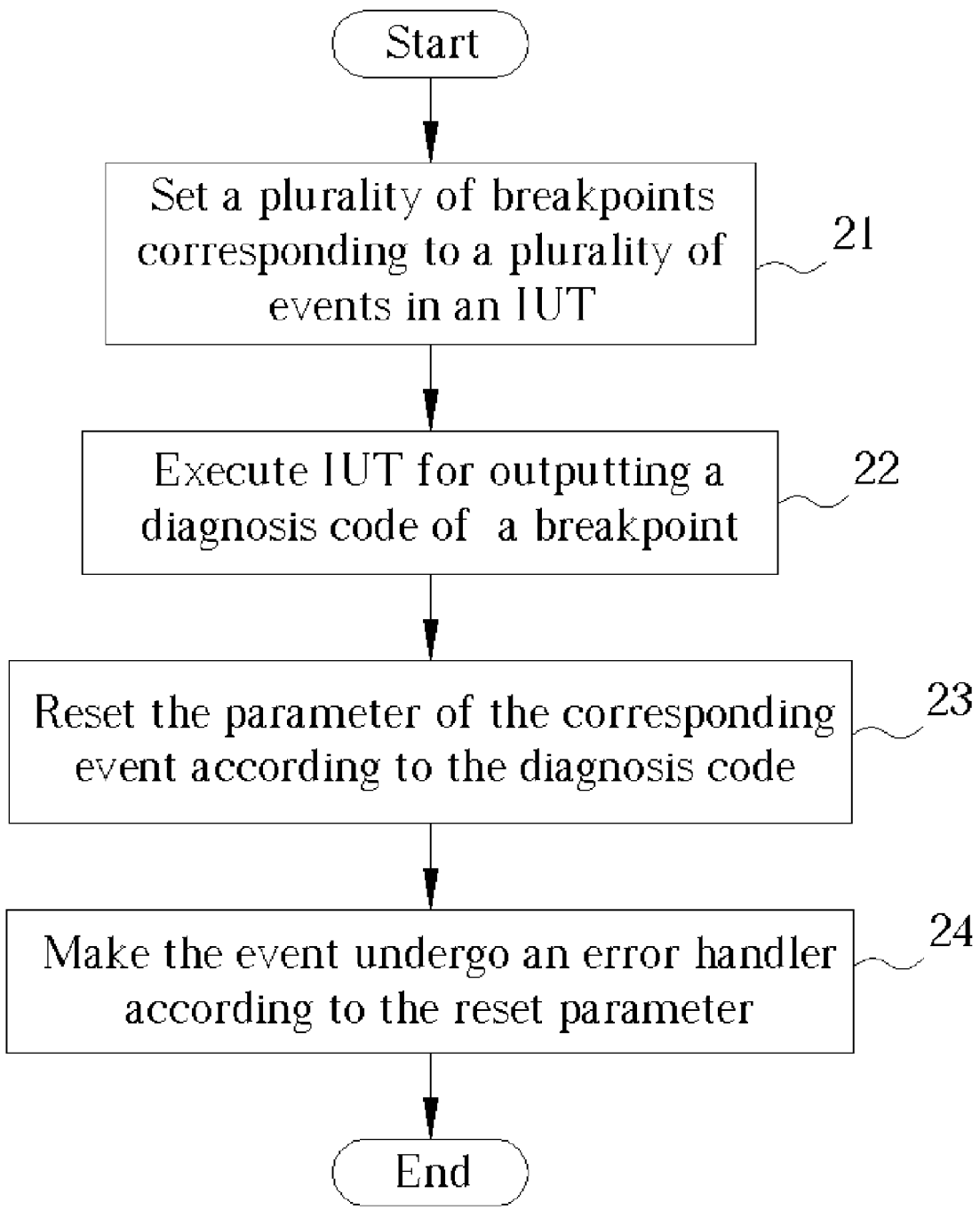
FIG. 2 shows steps of the method for program debugging of the present invention.

Please refer to FIG. 2. Step 21 recites setting a plurality of breakpoints corresponding to a plurality of events in an IUT. In the embodiment of the present invention, take a BIOS for example. Of course, the IUT can be a driver program or other similar program.

Figure 3:
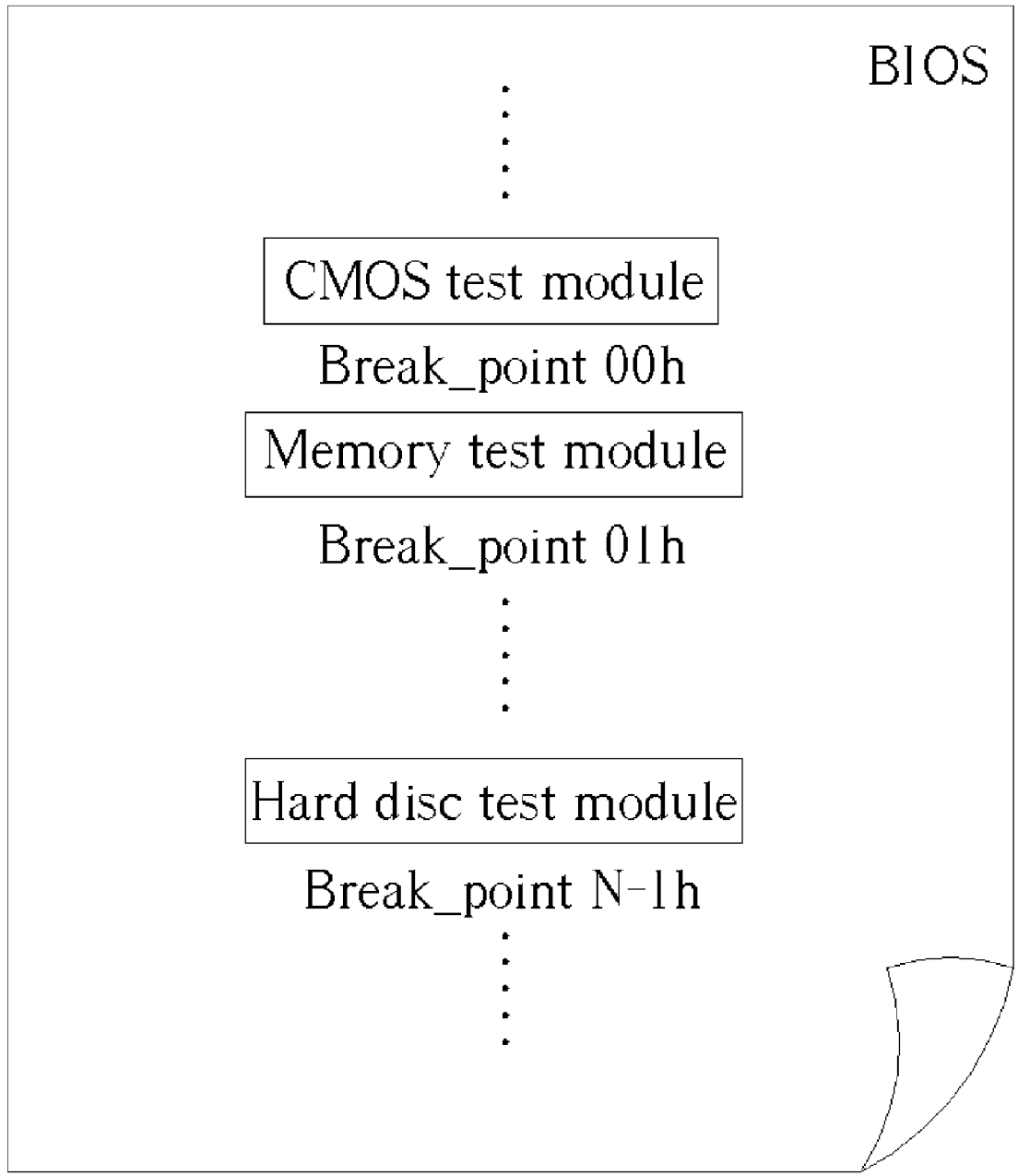
FIG. 3 shows addresses of breakpoints in an implementation under test.

Please refer to FIG. 3. Since the BIOS program code executes BIOS for peripheral devices, the BIOS program code can be divided into many test modules. Since there are many modules in BIOS, consider a CMOS test module, a memory test module, and a hardware test module for example. Events are defined as tests executed to each peripheral device. In each event, there are two processing states: one is a general processing state when the device is working well and the other is an error processing state when the device is out of order.

A breakpoint is set corresponding to an event, as shown in Table 1. Diagnosis codes are defined by designers. Note that addresses of each breakpoint can be set ahead of each event. Also, addresses of each breakpoint can be set after each event.

TABLE 1

| Breakpoint | Diagnosis code | Test |
| --- | --- | --- |
| 1st breakpoint | 00h | CMOS test |
| 2nd breakpoint | 01h | Memory test |
| . | . | . |
| . | . | . |
| . | . | . |
| N-th breakpoint | N-1h | Hardware test |

The interrupt nature of breakpoints means a software interrupt, using a trap to stop the execution of the emulator. In addition, in the embodiment of the present invention, the output port of the above-mentioned diagnosis codes is port 90*h*.

Next, as step 22 recites, the IUT is executed by means of the script file for outputting different diagnosis codes at different sections, such as outputting 01*h*.

Step 23 recites that in each event, the branch of instructions is executed after assigning different parameters; therefore, step 23 includes two sub-steps: (1) deleting parameters of corresponding events in the IUT, and (2) inputting new parameters for turning the path of general state into the path of error state. For instance, if the above-mentioned diagnosis code 01*h* is detected, the original parameter of the IUT is placed with 0FAh. This causes the execution of memory test module to turn into the path of error handler "no memory".

Finally, as step 24 recites, after resetting the parameter in step 23, when the program code of the corresponding event is executed, this can simulate the hardware under an error condition, and the program code can execute the error handler. For instance, an error message could be displayed, a signal to make the motherboard emit an audible signal (beep) could be generated, or a system reset or stopping signal could be generated. Take the abovementioned diagnosis code 01*h* for example. In step 24, it sends a signal of Beep 2-1-2 to inform users of a memory error state. As mentioned above, if the breakpoints are set ahead of the events, the parameters are reset after the breakpoints. If the breakpoints are set after the events, the script file should spontaneously jump ahead of the branch command of the event and reset the parameter of the event.

Therefore, by the above-mentioned method, when executing steps 23 and 24 to each event, error states of IUT can be detected one by one. On the premise that we do not have to destroy the hardware, we can know if the ability of IUT to handle the error state when the hardware is out of order is sufficient.

Figure 4:
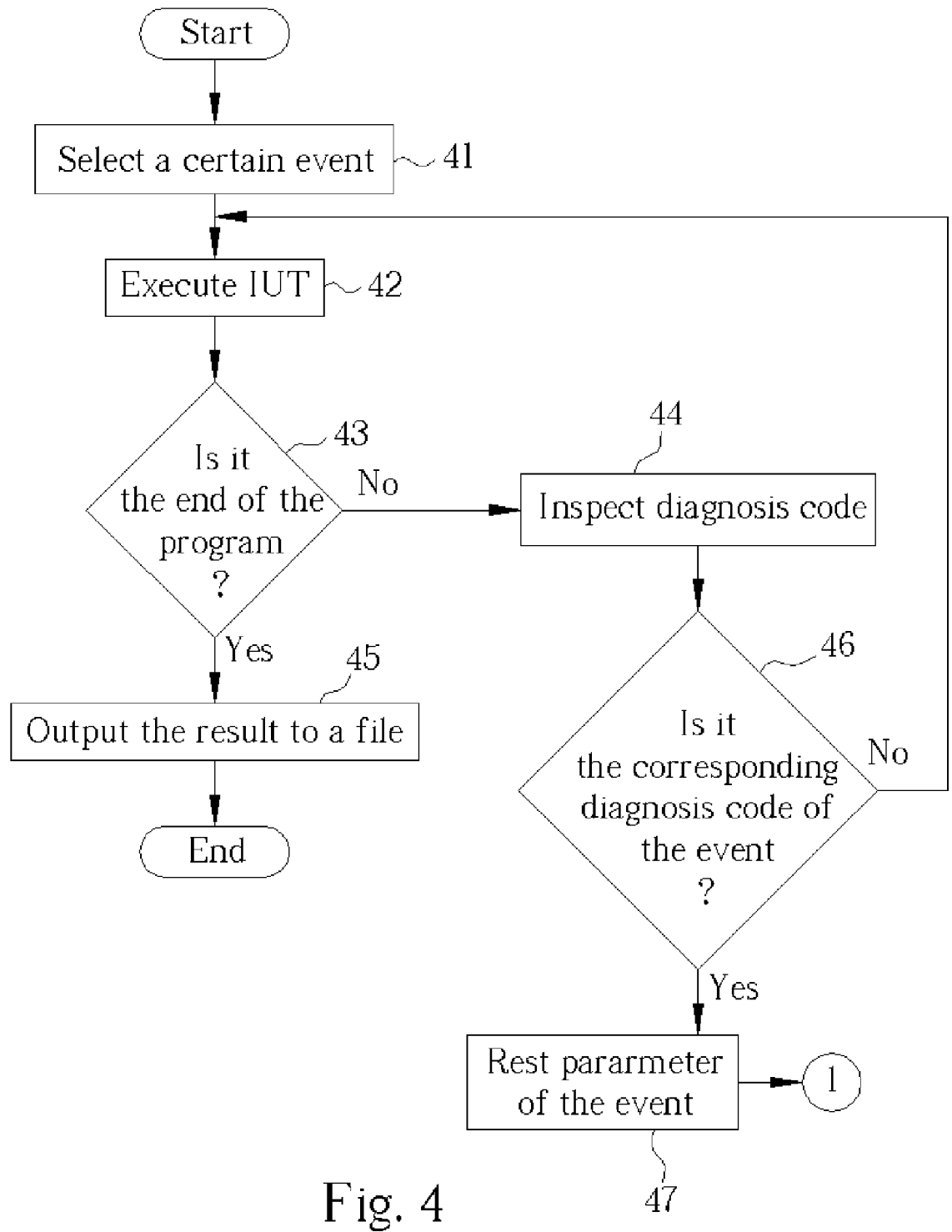
FIG. 4 shows steps of the script file of the present invention.

Furthermore, as shown in FIG. 4, users also can debug a certain event of the IUT, such as hardware error. Step 41 recites selecting a certain event. Next, step 42 recites executing the IUT. Since the breakpoints are set in the IUT already, if the IUT is executed at the breakpoints instead of the end of the program, then the diagnosis codes of the breakpoints are inspected, as in step 43 and 44. When the execution of all of the commands is correct, the script file is written with the result of the execution of the IUT into for history tracking, as in step 45.

Step 46 recites that the diagnosis code, when the program is interrupted, is compared with the diagnosis code which a user assigns. If the diagnosis code answers to the diagnosis code which a user assigns, step 47 is executed for resetting the related parameters. If the diagnosis code does not answer to the diagnosis code that the user assigned, the IUT is executed until the diagnosis code answers to the diagnosis code that the user assigned.

Figure 5:
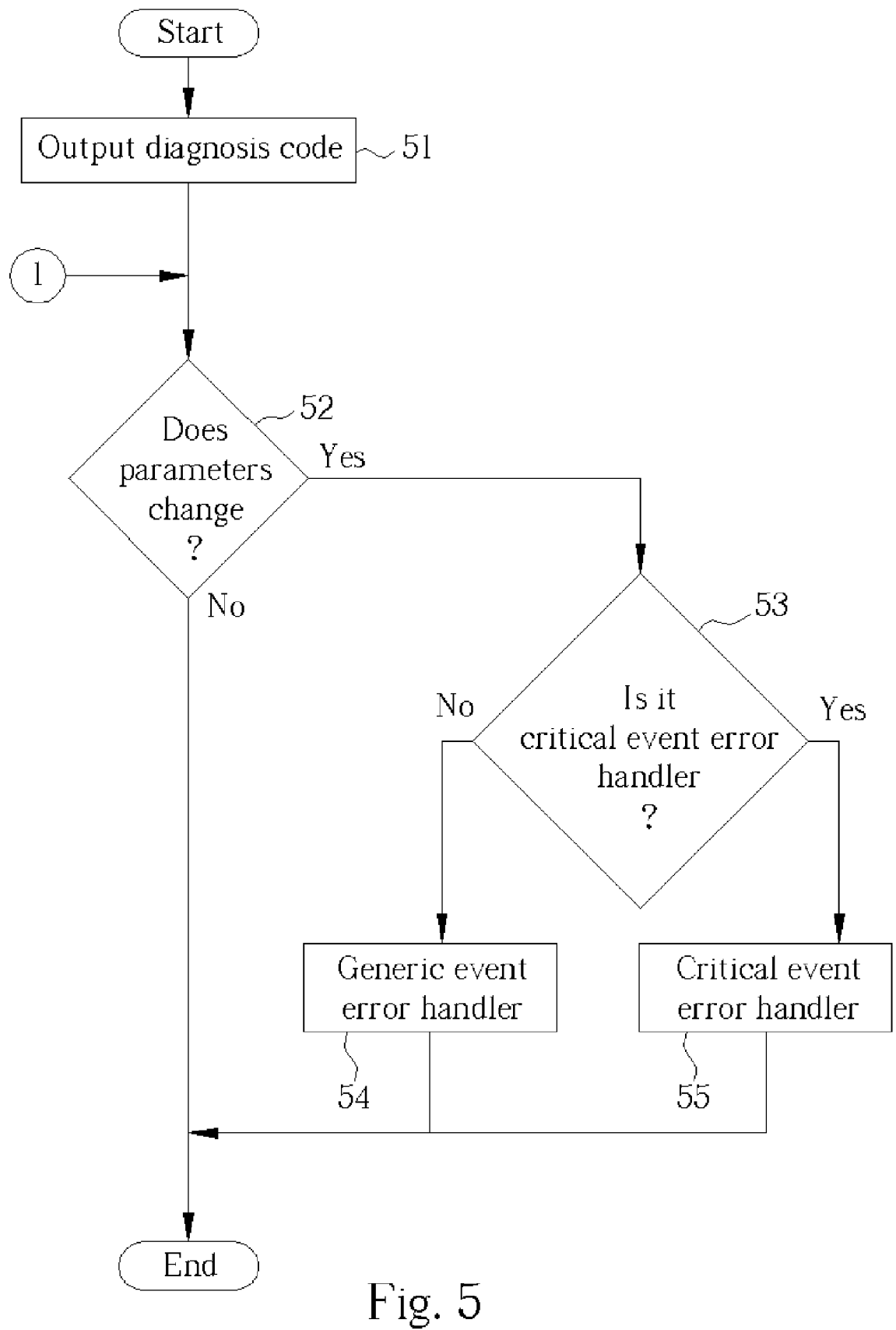
FIG. 5 shows steps of the implementation under test of the present invention.

Please refer to FIG. 5. Step 51 recites that due to the script file, the IUT outputs different diagnosis codes while executing different sections and stops outputting when the diagnosis code answers to the user assigned diagnosis code.

Step 52 recites that when the diagnosis code answers to the user assigned diagnosis code, the event under test is being executed and the parameters of the IUT are deleted and reset by the script file. If the reset parameters are the same as the original parameters, the execution of the IUT is the path of general state. If the reset parameters are different from the original parameters, the execution of the IUT is the path of error state. There are two error handlers: one is the generic event error handler and the other is the critical event error handler, both being respectively executed according to different parameters. The generic event error handler displays error messages and writes errors into a file. The critical event error handler is an audible tone (Beep 3-3-2, Beep 2-2-1, and so on.), a system reset, or a stop execution command, and so on. Finally, after undergoing the error handler, the IUT is executed until the end of the program.

The above-mentioned steps are executed by means of the above-mentioned program tools according to the breakpoints for executing the script file, and the IUT is debugged automatically.

Therefore, by the above-mentioned steps, whether selecting a certain event under test or testing all of the events in an IUT, both can be executed speedily. Whats more, execute error handlers can be executed without destroying the hardware, and after the IUT is amended and recompiled, debugging can be continued without rewriting the script file. This can achieve the purpose of the present invention.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for program debugging, the method comprising:

setting a plurality of breakpoints corresponding to a plurality of events in a Basic Input/Output System (BIOS) program code, each event being a test executed by the BIOS program code to a peripheral device and taking a general processing path when the peripheral device is working well or an error processing path when the peripheral device is in an error state;

executing the BIOS program code for outputting a diagnosis code of one of the plurality of breakpoints;

setting a parameter to simulate the peripheral device is working well throughout execution of the event corresponding to the diagnosis code by a branch command of a script file via an emulator;

executing the event corresponding to the diagnosis code according to the parameter for making the event undergo the general processing path;

resetting the parameter to simulate the peripheral device being in the error state throughout execution of the event corresponding to the diagnosis code by the branch command of the script file via the emulator; and executing the event corresponding to the diagnosis code according to the reset parameter for making the event undergo the error processing path;

wherein the breakpoints are software interrupt, using a trap to stop the execution of the emulator;

wherein the breakpoint can be set ahead or after program codes of the corresponding event;

if the breakpoints are set ahead of the corresponding events, the parameters are reset after the breakpoints;

if the breakpoints are set after the corresponding events, the script file should spontaneously jump ahead of the branch command of the event and reset the parameter of the event.

2. The method of claim 1 wherein the error processing path produces an audible tone.

3. The method of claim 1 wherein the error processing path causes a system reset.

4. The method of claim 1 wherein the error processing path causes a system execution interrupt.

5. The method of claim 1 further comprising:

executing the BIOS program code until the diagnosis code of the breakpoint matches a predetermined diagnosis code before resetting the parameter of the event corresponding to the diagnosis code, and executing the event corresponding to the diagnosis code according to the reset parameter for making the event undergo the error processing path.

6. The method of claim 1 further comprising executing both the general processing path and the error processing path of all events of the plurality of events.

7. A method for program debugging, the method comprising:

setting a plurality of breakpoints corresponding to a plurality of events in a driver program code, each event being a test executed by the driver program code to a peripheral device and taking a general processing path when the peripheral device is working well or an error processing path when the peripheral device is in an error state;

setting a parameter by a branch command of a script file via an emulator to simulate that the peripheral device is working well throughout execution of the driver program code;

executing the driver program code according to the parameter for outputting a diagnosis code corresponding to each breakpoint of the plurality of breakpoints;

for said each breakpoint, determining whether the diagnosis code matches a user defined diagnosis code; and resetting the parameter by the branch command of the script file via the emulator to simulate that the peripheral device is in the error state and executing the event corresponding to the diagnosis code according to the reset parameter for making the event undergo the error processing path when it is determined that the diagnosis code matches the user defined diagnosis code;

wherein the breakpoints are software interrupt, using a trap to stop the execution of the emulator;

wherein the breakpoint can be set ahead or after program codes of the corresponding event;

if the breakpoints are set ahead of the corresponding events, the parameters are reset after the breakpoints;

if the breakpoints are set after the corresponding events, the script file should spontaneously jump ahead of the branch command of the event and reset the parameter of the event.

8. The method of claim 7 further comprising continuing execution of the driver program code to a next breakpoint without resetting the parameter when it is determined that the diagnosis code does not match the user defined diagnosis code.

9. A method for program debugging, the method comprising:

setting a plurality of breakpoints corresponding to a plurality of events in a Basic Input/Output System (BIOS) program code, each event being a test executed by the BIOS program code to a peripheral device and taking a general processing path when the peripheral device is working well and taking a generic event error handling path or a critical error path when the peripheral device is in an error state according to the error state, the path taken determined by a parameter;

setting the parameter by a branch command of a script file via an emulator to determine the general processing path;

executing the BIOS program code according to the parameter for outputting a diagnosis code at each breakpoint of the plurality of breakpoints, each diagnosis code uniquely indicating the event corresponding to one of the said each breakpoint of the plurality of breakpoints;

when the outputted diagnostic code matches a predetermined diagnostic code, resetting the parameter by a branch command of the script file via the emulator to determine which of the generic event error handling path or the critical error path is to be taken;

when the reset parameter determines the generic event error handling path is to be taken, executing the BIOS program code according to the reset parameter; and when the reset parameter determines the critical event error handling path is to be taken, executing the BIOS program code according to the reset parameter;

wherein the breakpoints are software interrupt, using a trap to stop the execution of the emulator;

wherein the breakpoint can be set ahead or after program codes of the corresponding event;

if the breakpoints are set ahead of the corresponding events, the parameters are reset after the breakpoints;

if the breakpoints are set after the corresponding events, the script file should spontaneously jump ahead of the branch command of the event and reset the parameter of the event.

10. The method of claim 9 further comprising when executing the BIOS program code according to the reset parameter and the reset parameter determines the generic event error handling path is to be taken, writing error messages to a file.

11. The method of claim 9 further comprising when executing the BIOS program code according to the reset parameter and the reset parameter determines the critical event error handling path is to be taken, the critical error handling path generates an audible tone, a system reset, or a stop execution command.

* * * * *